April 15, 1958   W. H. CLENDENIN   2,830,848
FORAGE BLOWER
Filed June 4, 1956   2 Sheets-Sheet 1
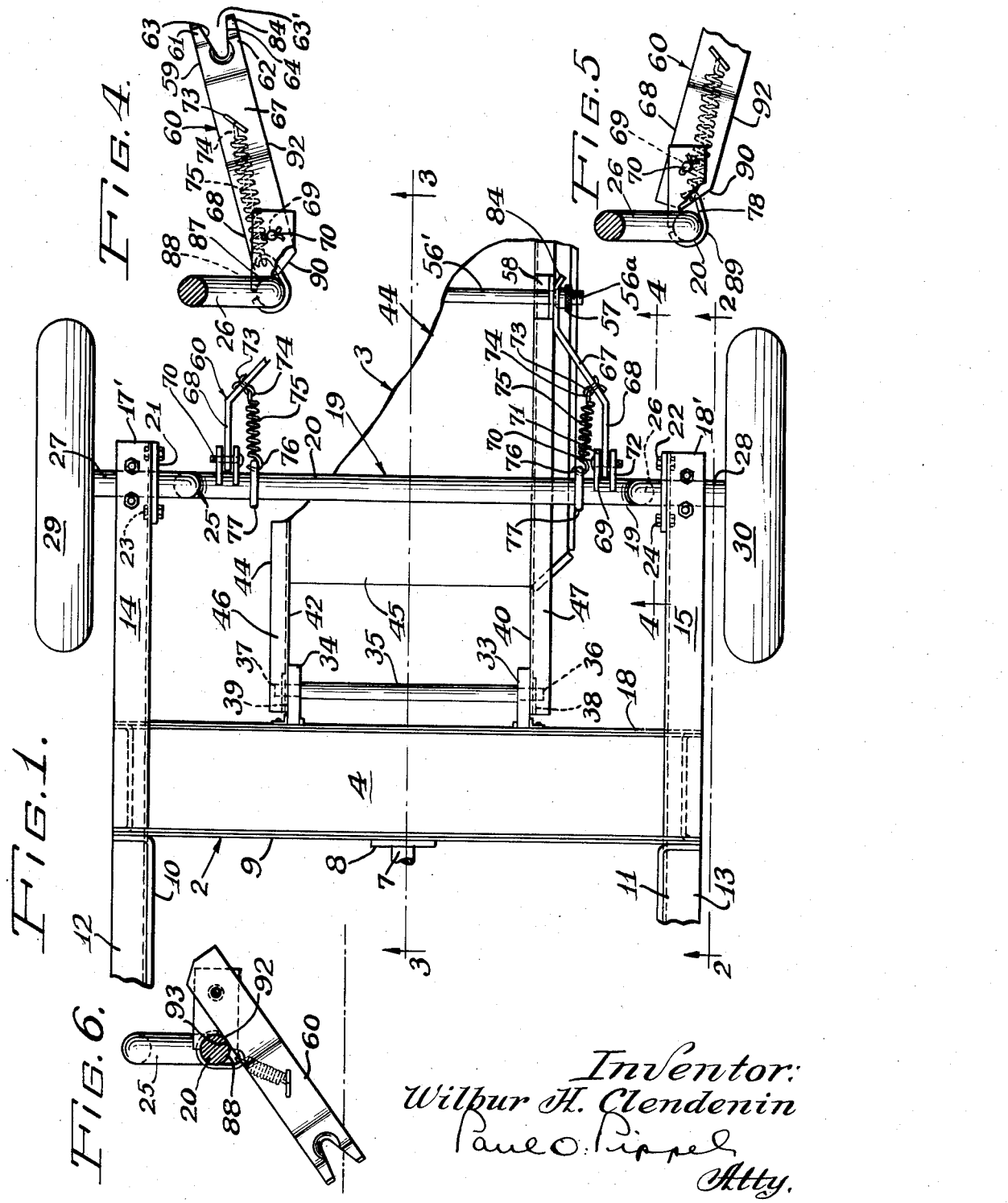
Inventor:
Wilbur H. Clendenin
Paul O. Pippel
Atty.

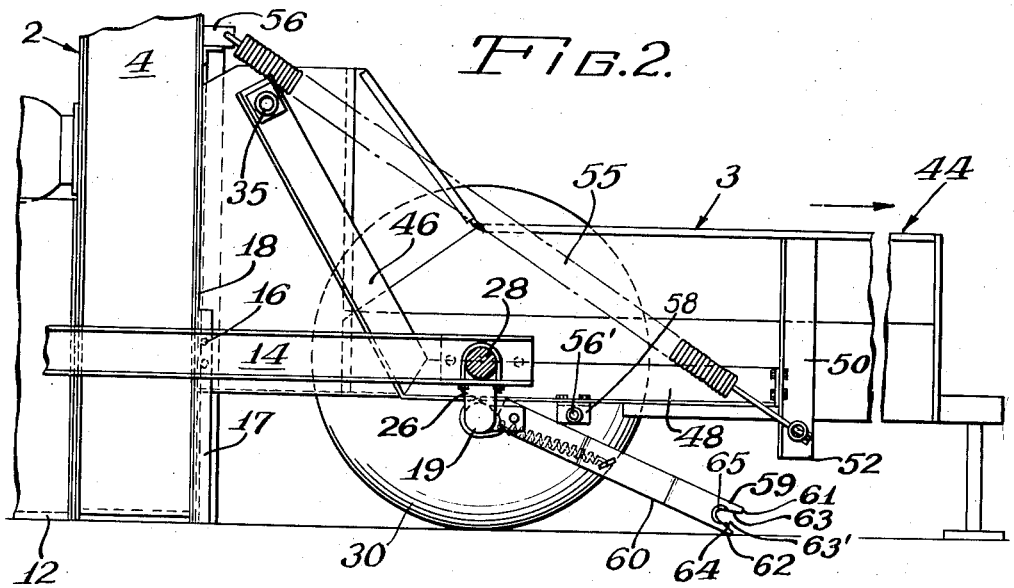

United States Patent Office 2,830,848
Patented Apr. 15, 1958

2,830,848

FORAGE BLOWER

Wilbur H. Clendenin, Berwyn, Ill., assignor to International Harvester Company, a corporation of New Jersey Application June 4, 1956, Serial No. 589,097

12 Claims. (Cl. 302—37)

This invention relates to blowers of the type adapted for elevating material such as forage.

A general object of the invention is to provide a novel forage or grain blower of the type which is adapted to be towed behind a vehicle and which comprises an elongated material-receiving conveyor hingedly connected to a blower casing wherein the conveyor portion is adapted to be swung upwardly out of the way of wagons which are to be driven adjacent to the blower crosswise of the conveyor, conveyor being lowered behind the wagon which then is unloaded.

More specifically the invention contemplates the novel provision of common means for arranging the blower section and the conveyor section, in operating, transport or repair positions, the blower section being provided with wheels and, the two sections being arranged to jack-knife so as to lift a ground-engaging portion of the blower off the ground for transport or wheel change.

A further object of the invention is to provide a novel latching mechanism between the conveyor and the blower sections which effects a releasable interlock between the sections upon the conveyor being swung upwardly to transport position so that a minimum of effort is required of the operator whereby he may dispose the sections in transport or operating position with ease.

These and other objects of the invention will become more apparent from the specification and the drawings, wherein:

Figure 1 is a fragmentary bottom view of the novel blower with parts broken away in order to more clearly illustrate the invention;

Figure 2 is a longitudinal sectional view taken substantially on the line 2—2 of Figure 1;

Figure 3 is a further longitudinal sectional view taken substantially along the line 3—3 of Figure 1;

Figure 4 is an enlarged sectional view taken substantially on the line 4—4 of Figure 1 illustrating the latching mechanism in latching position;

Figure 5 is a sectional view comparable to Figure 4 but illustrating the latching mechanism in normal operating position of the mechanism; and Figure 6 is a sectional view comparable to Figures 4 and 5 and illustrating the position of the latching arm in raising relation to the blower assembly.

Describing the invention in detail and referring to the drawings there is shown a blower section 2 and a conveyor section 3 which together constitute a forage or grain blower. The blower section includes a casing 4 within which is housed the usual blower wheel or rotor fragmentarily shown at 5 which comprises a bladed portion 6, the rotor being connected to a stub shaft 7 which is carried on a bearing 8 (Fig. 1) on the upstanding rear wall 9 of the housing 4. The rear side of the blower is provided with a support unit including frame constituting members 10 and 11 which at their lower ends provide feet 12 and 13 which are adapted in the operating position of the blower as shown in Figures 1 and 2 to rest upon the ground. The frame structure or more specifically the members 10 and 11 are connected to longitudinally extending side beams 14 and 15 which embrace opposite sides of the casing 4 and are suitably connected therewith as by welding or in any other conventional manner, or preferably as by riveting, at 16 to securing elements 17 suitably located on the forward wall 18 of the blower. Corresponding ends 17' and 18' of the beam members 14 and 15 of the frame structure are connected to opposite ends of a transverse axle structure 19 which comprises a medial portion 20 extending between the beams 14 and 15, the opposite ends being provided with mounting plates 22 which are fastened as by bolts 23 and 24 to the respective beams 14 and 15 the opposite ends being provided with mounting plates 22 which are fastened as by bolts 23 and 24 to the respective beam 14 and 15. The opposite ends of the center portion 20 of the axle is provided with upstanding portions 25 and 26 which extend to the beam members 14 and 15 and at their upper ends are provided with outwardly extending spindles 27 and 28 on the outer ends of which are rotatably mounted wheels 29 and 30 which are disposed outwardly of the respective beams 14 and 15.

It will be observed that in the operating position of the blower as shown in Figure 2 the pedestals 12 and 13 as well as the wheels 29 and 30 provide a support for the blower in a substantially stationary position.

The casing 2 on its wall 18 is provided with a pair of brackets 33 and 34 which extend outwardly toward the conveyor and are suitably fastened to said front wall either by welding or by riveting or any other convenient method, these brackets supporting a transverse pivot member 35 which is in the form of a tube which spans the space therebetween and extends outwardly thereof and the end portions 36 and 37 project through bearings 38 and 39 mounted on the upstanding opposite side lateral walls 40 and 42 of the conveyor trough generally designated 44, the sides 40 and 42 being inter-connected by a bottom wall 45. The trough sides are rigidified by diagonal beam structures 46 and 47 which are pivoted at their upper ends upon the pivot member 36 and extend downwardly and merge into longitudinal portions 48 and 49 which terminate and connect to vertically extending anchor members 50 and 51 which are disposed intermediate the ends of the conveyor trough 44 along opposite sides thereof. The anchors have lower end portions 52 and 53 which extend beneath the bottom wall 45 and to which are connected the lower ends of counter balancing springs 55 which extend diagonally upwardly and at their upper ends connect to lugs 56 on the wall 18 of the blower housing.

A transverse latching element in the form of a rod 56' is connected by brackets 58 to the bottom wall 45 and has end portions 56a extending outwardly of the respective bracket 58. The end portions 56a have threaded a nut 57 thereon adapted to engage between the same and the outer side of the related bracket 58 a bifurcated distal end 59 of an associated latching member 60.

It will be observed that each latching member 60, there being two provided—one at each side of the conveyor, comprises at said distal end 59 the bifurcation which includes upper and lower lug portions 61 and 62 with adjacent edges 63 and 64 converging inwardly into a socket 65 or slot which receives the bolt 56' therein in the locked position of the latch with the bolt. The distal end portion 59 extends generally parallel to the adjacent side of the conveyor lengthwise thereof and at its inward extremity joins an angled or diagonal medial or intermediate portion 67 which projects a substantial distance outwardly of the conveyor trough and at its outboard extremity emerges with a rear or inner or proximal end portion 68 of the latching member, said end portion 68 being pivoted as at 69 on a pin 70 on a generally horizontal axis, said pin 70 being mounted on a pair of ears or lugs 71 and 72 which are interconnected with the lower portion 20 of the axle. It will be observed that each locking member or link 60 is connected at its medial portion 67, as by a cotter pin or eye 73 to one end 74 of a tension spring 75, the opposite end of the tension spring being hooked over as at 76 to a shackle or hook 77 which includes a reach portion 78 disposed substantially tangential to the circular or cylindrical shaft portion 20, the rear end of the reach portion 78 with respect to the spring being provided with the hook 79 which attaches with the adjacent end 76 of the spring, and the opposite end of the reach portion having a second hook 80 which encircles and hooks under and around the shaft or axle 20. It will be seen in Figures 1 and 5 that the spring axis is disposed in the operating position of the platform or trough below the axis of the pin 70 that is below dead center position and in the latching position above the axis of rotation of the arm 60 (Fig. 4). Thus in the operating position the arm is caused to dig into the ground and in the latching position the arm which is swung upwardly first and then the conveyor is swung upwardly about the shaft 35 as assisted by the counter-balancing springs. It will be observed that when the conveyor is swung upwardly and after the operator having preliminarily swung the arms 60 so they abut against the underside of the latching or locking bolt 56' the springs 75 tend to hold the upper edges 86 of the arms against the lower or undersides of the bolt until the distal ends are overridden whereupon the latch arm swings upwardly. This upward movement is limited through abutment of the edge 87 of each arm with the opposing periphery 88 of the axle structure 20. It will be noted that the notch 63' between the surfaces 63 and 64 is positioned on the arc of swinging movement of the locking bolt 56' about the axis 35 so that if the conveyor is swung upwardly to unlatch the conveyor from the arms then the bolt easily exits from the slot and conversely enters into the slot upon latching. In order to lock the arm with the bolt the nuts 57 are, of course, tightened as well seen in Figure 1 behind the outturned ends 84 of the lugs 61 and 62.

The arms 60 also serve a secondary function to jack up the blower unit. It will be seen that the lower corners are cut off at 90 (Fig. 5) of the proximal ends of the latching members so that the arms may be swung under the axle to a lifting position (Fig. 6) and their effective length is such that it is greater than the radius of the wheels so that the wheels are raised off the ground, it being understood that the outer or distal ends of the latching arms have been dug into the ground due to pulling the conveyor in the direction shown by the arrow in Figure 2, that is, in a direction away from the blower casing 4. It will be observed that in such position the spring assembly is swung under the shaft 20 and that the normally lower edge 92 of each arm bears as at 93 against the opposing periphery 88 of the axle member 20.

I claim:

1. For use in a crop blower comprising a frame having a depending front portion and rearwardly extending wheel brackets, ground wheels rotatably carried by the brackets, a blower casing rigidly secured to the frame and extending transversely of the line of travel of the crop blower, a longitudinally extending conveyor hingedly connected to the frame in rear of the blower for vertical swinging movement with respect thereto, said conveyor extending generally parallel with the line of travel of the crop blower, and the frame being rockable on the wheels with attendant jackknifing of the casing and conveyor, the improvement comprising: latch means between the frame and conveyor including an arm movably mounted on the frame for vertical swinging movement, said arm having a distal end with a notch therein, a latching element on said conveyor disposed in the path of movement of the arm and escape over the end of it to enter said notch in the jackknifed position of the casing and conveyor for holding the same in such position, and resilient means for biasing said arm in a direction toward said element for guided engagement thereby.

2. In a machine of the class described, comprising a supporting unit adapted to rest upon the ground, material handling means including a rotor housing formed about a generally horizontal axis, and a generally horizontal feeder leading into the housing, said housing and feeder being pivotably interconnected for relative vertical swinging movement, ground engaging wheel means connected to said supporting unit and positioned at one end of said feeder adjacent to said housing, the improvement comprising: an elongated locking element having one end pivotally connected to said supporting unit and swingable vertically, tension spring means connected between said supporting unit and said element, said element and said spring means having a position in transverse alignment with each other, and said spring means swingable downwardly below the axis of pivot of said element for urging said element downwardly into the ground and swingable above said axis to urge the element upwardly, said element and unit having cooperative abutments engageable to limit upward swinging of said element, and said feeder having latching means extending into the path of upward swinging said element for engagement thereby attendant to upward urging by said spring means, and said element having means adapted to be disposed in latching relationship with said latching means in response to upward swinging of said feeder.

3. In a machine of the class described comprising a supporting unit adapted to rest in a relatively stationary position upon the ground, material handling means including a rotor housing formed and fixed to said supporting unit about a generally horizontal axis, a generally horizontal feeder leading into the housing and pivoted to said housing at one end for vertical swinging movement relative thereto, and means on the other end of the feeder adapted to rest upon the ground for supporting that end of the feeder, the improvement comprising: a latch member having one end pivoted to said supporting unit for vertical swinging movement, tension spring means pivoted at one end to said unit on an axis generally parallel to the axis of said member and in general horizontal alignment therewith and spaced therefrom in a direction away from said member, said spring means having another end pivotally connected to said member intermediate its ends, said member swingable upwardly and downwardly past the dead center position of the spring means and member whereby said spring means biases said member upwardly and downwardly respectively, a transverse latching element on said feeder disposed in the path of upward movement of said member whereby said member abuts against said element when swung upwardly past said dead center position and held in engagement therewith by said spring means, said member having slidable movement upon said element in a direction toward its free end upon upward swinging movement of said feeder, said member having a notch at said free end for receiving said element therein upon said element aligning therewith, means on said element and member for releasably locking the same when said element is in said notch, said unit having a portion extending toward said feeder from said housing and ground wheels on said portion disposed on a generally horizontal axis transversely of said feeder and upon which said support, housing and feeder is adapted to be swung in a direction lowering said feeder and elevating the housing and the unit off the ground for transport coincidental with said member and element being interlocked.

4. For use in a device of the class described comprising a forage blower unit, a feed trough pivotally connected to said unit for vertical swinging, a framework extending from said unit beneath said feed trough, wheel means on the framework at opposite sides of the feed trough, the improvement comprising: a latching arm rotatably secured to said framework and extending along said feed trough for vertical swinging movement, a locking element secured to said feed trough and etxending transversely of said arm in the path of movement thereof when said trough is disposed generally horizontally for abutment with said arm, spring means connected between said arm and said unit for biasing said arm upwardly or downwardly, and said arm having a notch adapted to register with said element for locking said element with the arm attendant to upward swinging of said feed trough to lock said trough and unit in downwardly converging relationship whereupon said trough is adapted to be swung downwardly on said wheel means for raising said blower unit.

5. In combination, a blowing unit adapted to rest upon the ground in operating position, a feed trough hinged to said unit for vertical swinging movement, a link having a proximal end pivoted to said unit for vertical swinging movement and extending toward said trough and terminating in a distal end, interlocking means on said trough and said link adapted to be interlocked with each other upon swinging of said trough and said link upwardly, wheel means connected to said blowing unit at opposite sides of the adjacent end of said trough whereby the trough and unit are adapted to be rocked about said wheel means in the interlocked position of said first-mentioned means, said link upon disconnection of said interlocking means adapted to be swung downwardly with said distal end into the ground and having a length greater than the distance from the ground to its pivot with the unit and said unit adapted to be moved troughwardly to cause said link to swing toward said wheel means from its position extending diagonally downwardly from said wheel means to raise the same off the ground.

6. For use in a forage blowing unit including an elongated feed trough secured to said unit for vertical swinging movement, a support frame adapted to sit upon the ground fixed to said unit and extending beneath the adjacent end of the trough, a wheel and axle assembly comprising an axle extending transversely beneath said end of the trough and connected to said frame and wheels at opposite ends of the axle, lugs connected to said axle, an arm extending lengthwise of the trough having one end pivoted to said lugs for vertical swinging movement, a tension spring rotatably secured to the axle at one end and at the other end to said arm intermediate the ends thereof, said spring and arm having a dead center position and said spring operative to urge said arm downwardly when said arm is swung below said dead center position and to urge said arm upwardly when swung above said dead center position, a latching element carried on the trough in the path of upward movement of said arm and extending transversely thereof for slidable engagement thereby when said trough is in operating position, said trough swingable upwardly about an axis spaced vertically from the swinging axis of said arm whereby said element slides toward the outer end of said arm as the arm is urged upwardly, said arm having a notch in its outer end receiving said element therethrough and said arm having an outwardly bent portion on the outer end and said element having a nut threaded thereon adapted to be engaged with said arm behind said bent portion for releasably latching the arm and said element.

7. For use in a device of the class described comprising a wheeled frame, a blower casing member fixed to the frame, and a feed trough member hinged to the casing member for vertical swinging movement from a horizontal operating position to an elevated transport position: a latching arm pivoted on one of said members and extending lengthwise of the trough member toward the other member, and a latching element on the other member extending transversely of the arm in the path of upward swinging thereof when the feed trough is in horizontal position, over-center spring means between said arm and said one member for urging the arm upwardly or downwardly when said arm is swung upwardly or downwardly respectively with respect to the dead center position, said arm in said upwardly swung position slidably engaging and extending beneath said element and movable lengthwise toward its outer end along said element in response to upward swinging movement of the feed trough, and interlocking means on said arm for receiving said element and automatically interlocking therewith attendant to upward swinging of the arm and trough.

8. The invention according to claim 7 and further characterized in that said arm has a distal end adapted to engage the ground for limiting downward movement of the arm by said spring means, and said arm normally extending diagonally from its pivot to the ground and swingable to a lifting position by bodily movement of said frame thereby jacking up said frame and lifting the wheels off the ground.

9. The invention according to claim 8 and said arm and said frame having cooperating abutment for limiting said swinging movement of the arm to said lifting position.

10. In a latching assembly for a device of the class described, a support including a transverse member, a structure hinged on the support for vertical swinging movement, a lug connected to said member and extending radially outwardly therefrom, an arm having a proximal end pivoted to said lug on an axis parallel and spaced from said member, said arm having an intermediate portion extending diagonally to said axis, a tension spring pivoted to said member at one end on an axis spaced from said first axis and having an opposite end pivotally connected to said intermediate portion, said spring and arm transversely aligned in dead center position, said spring operative to swing said arm upwardly or downwardly when said arm is moved respectively above or below said dead center position, a locking element on said structure extending across the path of movement of the arm and engaged thereby as said spring moves said arm against said element, said arm having a notch adapted to automatically receive said element as said structure is swung upwardly.

11. The invention according to claim 10 and said arm having a portion presenting an abutment face and said member presenting an opposing abutment surface engageable with said face for limiting upward movement of the arm.

12. The invention according to claim 10 and said arm swingable downwardly beyond upright position in jacking relation to said member and formed and arranged to abut with said member for limiting such swinging movement of the arm.

References Cited in the file of this patent

UNITED STATES PATENTS

| 1,540,247 | Bowman | June 2, 1925 |
| 2,472,382 | Miller | June 7, 1949 |
| 2,666,672 | Hill | Jan. 19, 1954 |
| 2,678,239 | Heth | May 11, 1954 |